United States Patent [19]

Gemeinhardt et al.

[11] Patent Number: 4,984,630
[45] Date of Patent: Jan. 15, 1991

[54] TUBE SHEET FOR APPARATUS FOR TRANSFERRING HEAT AND/OR MASS, USE THEREOF AND PROCESS FOR ITS PRODUCTION

[75] Inventors: Hermann Gemeinhardt, Obernburg; Elmar Hoff, Bochum; Erich Schürmann, Sendenhorst, all of Fed. Rep. of Germany

[73] Assignee: Akzo N.V., Arnhem, Netherlands

[21] Appl. No.: 317,522

[22] Filed: Mar. 1, 1989

[30] Foreign Application Priority Data

Mar. 1, 1988 [DE] Fed. Rep. of Germany ....... 3806517

[51] Int. Cl.[5] .............................................. F28F 9/02
[52] U.S. Cl. ................................ 165/173; 210/321.89; 165/905
[58] Field of Search .................... 210/321.8, 321.89; 165/173, 905

[56] References Cited

U.S. PATENT DOCUMENTS 3,228,876 1/1966 Mahon ................................ 210/638
3,459,622 8/1969 Fisher .
4,740,344 4/1988 Wollbeck et al. .
4,790,372 12/1988 Gemeinhardt et al. .

FOREIGN PATENT DOCUMENTS 1988637 4/1968 Fed. Rep. of Germany .
3124216 12/1982 Fed. Rep. of Germany .
3418201 11/1985 Fed. Rep. of Germany .
3636177 6/1987 Fed. Rep. of Germany .
59-109752 6/1984 Japan .
1107843 3/1968 United Kingdom .
1141102 1/1969 United Kingdom .

OTHER PUBLICATIONS

J. D. Robinson, "Gating and Cooling Techniques for Polypropylene" *Plastics,* Aug. 1965, pp. 47-51.

*Primary Examiner*—Alan Cohan
*Assistant Examiner*—Allen J. Flanigan
*Attorney, Agent, or Firm*—Oliff & Berridge

[57] ABSTRACT

In an injection-molded tube sheet of thermoplastic material for apparatus for transferring heat and/or mass with at least 25 through-holes for taking up tube ends, the holes have a hydraulic diameter of at most 3 mm and the minimum web width between neighboring holes is at most 0.4 mm. The thickness of the tube sheet ranges from 3 to 10 mm. Such a tube sheet is particularly suitable for the compact arrangement of tube ends and is therefore used for producing apparatus for transferring heat and/or mass. It is fabricated by an injection-molding process in which the melt is first distributed in the injection mold over the cross-sectional area before being pressed into the region of the tube sheet proper.

8 Claims, 1 Drawing Sheet

TUBE SHEET FOR APPARATUS FOR TRANSFERRING HEAT AND/OR MASS, USE THEREOF AND PROCESS FOR ITS PRODUCTION

TECHNICAL FIELD

The invention relates to an injection-molded tube sheet of thermoplastic material for apparatus for transferring heat and/or mass. The invention also relates to the fabrication of apparatus for transferring heat and/or mass using such a tube sheet. The invention also relates to a process for fabrication of such tube sheets.

BACKGROUND

In the fabrication of apparatus for transferring heat and/or mass that contain a relatively large number of tubes, tube sheets are usually used that have through-holes into which the tube ends are threaded and connected with the tube sheet. Various processes to arrange the tube ends as compactly as possible, especially in the tube sheet zone, have been developed. The closer together the tube ends are arranged, the more difficult it becomes to connect the tube ends with the tube sheet in such a manner that a leaktight connection is ensured even under relatively high pressures.

For leaktight connection of tube ends that are arranged as compactly as possible in heat exchangers containing tubes having no or only little porosity, a process has been developed in which the tube ends are placed tightly against each other and are connected to each other by radiant heat (West German Laidopen application Ser. No. 3,614,339). For somewhat less compactly arranged tube ends for apparatuses for transferring heat and/or mass, a connection between the tube ends can also be achieved by means of radiant heat by threading each tube end into a sleeve and placing the sleeves close together (West German Laid-open application Ser. No. 3,614,342).

Especially for the latter apparatus for transferring heat and/or mass (West German Laid-open application Ser. No. 3,614,342), very much positioning work is necessary in the fabrication thereof, because both the sleeves and tube ends must be held in position during the radiant-heat treatment. For better handling, it would be favorable first to connect all sleeves with each other before the tube ends are positioned in the connected sleeves. It would be even more favorable to be able to fabricate a molded shape that resembles sleeves connected with each other. In this case, however, care is to be taken that the minimum web width between neighboring holes of the tube sheet, which width in the case of circular holes lies on an imaginary connecting line between the centers of these neighboring holes, corresponds in order of magnitude to the wall thickness of the tube ends, in order to achieve uniform melting of tube sheet and tube ends during heat transfer by radiant heat. A leaktight connection between tube sheet and tube ends is achieved only by uniform melting of tube sheet and tube ends.

Since tubes with an outside diameter of 3 mm and a wall thickness of 0.4 mm or less are usually used in such apparatus for transferring heat and/or mass, the minimum web width between neighboring holes must also be at most 0.4 mm. Especially when 25 tubes or more (up to several thousand) are used in a single apparatus for transferring heat and/or mass, it has been impossible heretofore to fabricate molded shape with such small minimum web widths and such small cross-sectional dimensions for the through-holes from thermoplastic material using injection molding.

Injection molding is known to relate to processes in which thermoplastic material is introduced into an injection mold and cooled under pressure. The needles necessary in the injection mold to obtain the through-holes are not stable, because of the small cross-sectional dimension (3 mm diameter or less), and they deform because of the melt flowing between them, so that the maintenance of exact web widths is not possible and the holes even coalesce to some extent. Especially for tube sheets with 25 holes and more, it cannot be guaranteed that the melt will completely fill the injection mold in the case of these small web widths.

SUMMARY OF THE INVENTION

An object of the invention is to provide an injection-molded tube sheet of thermoplastic material for apparatus for transferring heat and/or mass with at least 25 through-holes for receiving tube ends, which tube sheet guarantees a compact arrangement of the tube ends and at the same time greatly reduces the work expenditure for the fabrication of heat exchangers. Another object of the present invention is to provide a process for the fabrication of such tube sheets.

These and other objects are achieved by an injection-molded tube sheet of thermoplastic material for apparatus for transferring heat and/or mass with at least 25 through-holes for receiving tube ends, wherein the holes have a hydraulic diameter of at most 3 mm and wherein a minimum wall thickness of at most 0.4 mm is present between neighboring holes.

BRIEF DESCRIPTION OF THE DRAWINGS

The invention will be explained in more detail by reference to the following figures, in which.

DETAILED DESCRIPTION OF PREFERRED EMBODIMENTS

Figure 1:
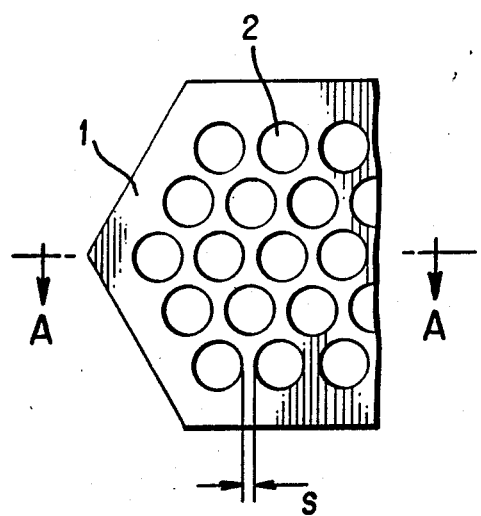
FIG. 1 shows a top view of a segment of a tube sheet according to the invention.

The hydraulic diameter $d_h$ is defined as the quotient of four times the internal cross-sectional area of the holes divided by the inside circumference (see Dubbel, Taschenbuch fuer Maschinenbau (Pocketbook for Mechanical Engineering), 23rd Edition, 1970, page 314, paragraph 4):

$$d_h = \frac{4 \text{ (internal cross} - \text{sectional area)}}{\text{inside circumference}}$$

In the case of holes with circular cross section, the hydraulic diameter $d_h$ is equal to the diameter of those holes. The concept of hydraulic diameter was chosen because holes with noncircular cross sections (e.g., elliptical, rectangular, etc.) can also be necessary if tubes with corresponding outside cross sections are used.

The minimum web width between neighboring holes is defined as the shortest distance between the walls of neighboring holes.

Preferably, the holes of the injection-molded tube sheet have a hydraulic diameter of at most 2 mm, especially of at most 1.7 mm. To achieve a compact arrangement, such a tube sheet has a minimum web width of at most 0.3 mm, preferably about 0.2 mm.

The tube sheet thickness is preferably between 3 and 10 mm, a thickness of 5 to 8 mm having proved favorable in terms of manufacture and stability of the tube sheet.

The tube sheets according to the invention are used preferably for the fabrication of apparatus for transferring heat and/or mass, these being suitable for use both for crossflow filtration and for dead-end filtration. For dead-end filtration, the tube ends can be connected at both ends with one tube sheet per end, one of the tube sheets being closed. A tube sheet in which, as described hereinafter with regard to the fabrication process, the layer formed because of the cross-sectional distribution of the melt is not cut off is particularly suitable for this purpose. The tubes for dead-end filtration can also be connected at only one end with a tube sheet according to the invention, the free ends of the tubes then being closed, for example by heat sealing. The tubes for dead-end filtration can also be bent to U-shape, each of the two ends being inserted in different holes of a single tube sheet and connected with the tube sheet.

The present invention also comprises a process for fabrication of the described tube sheet by feeding a melt of thermoplastic material into an injection mold, a needle being disposed in the injection mold for each through hole of the tube sheet to be fabricated. The melt is first distributed over substantially the entire cross-sectional area before being pressed into the region of the needles. The layer or disk formed because of the cross-sectional distribution is cut off after cooling.

For the cross-sectional distribution of the melt, it is unexpectedly sufficient for a free space of a few millimeters to be present above the needles in the injection mold, which essentially extends over the tube sheet cross section. Under these conditions the melt first fills this free space because of the lower flow resistance, and thereafter flows between the needles essentially in the direction of the needles, so that a greatly reduced transverse loading of the needles is obtained.

The use of thermoplastic plastics such as PVDP has proved best for the process according to the invention.

Figure 2:
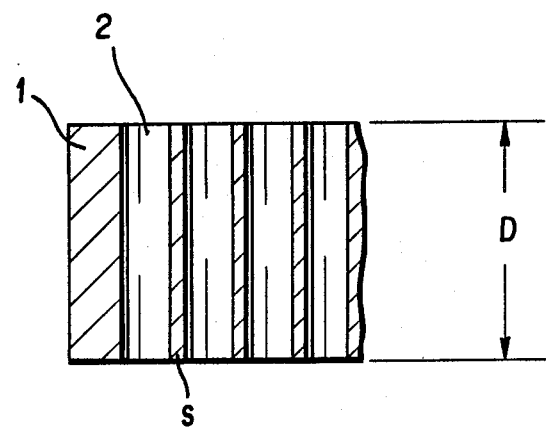
FIG. 2 shows section A-A of FIG. 1.

For clarity, FIGS. 1 and 2 show only one segment of one tube sheet according to the invention, the segment being shown in greatly enlarged form for illustrative purposes. The symbols 1 denote the tube sheet and 2 the through-holes of the tube sheet. For explanatory purposes, the minimum web width has been denoted by s and the thickness of the tube sheet by D in the figures. In the preferred embodiment of the claimed tube sheet, the hydraulic diameter of the through-holes is at most 3 mm, preferably at most 2 mm, the minimum web width s is at most 0.4 mm, preferably at most 0.3 mm or 0.2 mm, and the thickness D of the tube sheet 1 is between 3 and 10 mm, preferably between 5 and 8 mm.

What is claimed is:

1. Injection-molded, substantially planar tube sheet of thermoplastic material for an apparatus for transferring at least one of heat and mass, said planar tube sheet containing at least 25 unoccupied through-holes for subsequently receiving tube ends, with at least 3 of said through-holes being arranged in a non-linear relationship, wherein the holes have a hydraulic diameter of at most 3 mm and a minimum web width between neighboring holes of at most 0.4 mm.

2. A tube sheet according to claim 1, wherein the holes have a hydraulic diameter of at most 2 mm.

3. The tube sheet according to claim 1, wherein the holes have a hydraulic diameter of at most 1.7 mm.

4. A tube sheet according to claim 1, wherein the minimum web width is at most 0.3 mm.

5. The tube sheet according to claim 1, wherein the minimum web width is about 0.2 mm.

6. A tube sheet according to claim 1, wherein the tube sheet has a thickness of 3 to 10 mm.

7. A tube sheet according to claim 6, wherein said thickness is 5 to 8 mm.

8. An apparatus for transferring at least one of separate heat and mass, comprising a plurality of tubes and at least one tube sheet according to claim 1, such that tube ends of said tubes have been inserted in said through-holes of said tube sheet.

* * * * *